United States Patent Office 3,729,505
Patented Apr. 24, 1973

3,729,505
POLYOLS AND POLYURETHANES DERIVED FROM 5-PENTANOLIDES
Katsumi Hayashi, Mentor, Ohio, assignor to The Lubrizol Corporation, Wickliffe, Ohio
No Drawing. Filed Nov. 9, 1970, Ser. No. 88,141
Int. Cl. C08g 17/017
U.S. Cl. 260—484 A     8 Claims

ABSTRACT OF THE DISCLOSURE

Polyols are prepared by the reaction of 5-pentanolides (delta-valerolactones) with a polyhydroxy compound in the presence of an alkaline reagent. These polyols may be reacted with polyisocyanates to form elastomeric polyurethanes.

---

This invention relates to new compositions of matter and methods for their preparation. More particularly, it relates to polyols consisting essentially of compounds having terminal hydroxy groups and containing the repeating units $$-CH_2\underset{R^3}{\underset{|}{\overset{R^2}{\overset{|}{C}}}}-CH_2CH\underset{R^1}{\underset{|}{C}}\overset{O}{\overset{\|}{C}}-O- \text{ and } -R-O-$$

wherein R is a divalent hydrocarbon or substituted hydrocarbon radical, each of $R_1$ and $R_2$ is hydrogen or a hydrocarbon or substituted hydrocarbon radical, and $R^3$ is a hydrocarbon or substituted hydrocarbon radical, said units being joined through ester linkages.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such forms are included.

| | |
|---|---|
| Methyl | Isopropenylphenyl |
| Ethyl | Vinyl |
| Propyl | Allyl |
| Butyl | Ethynyl |
| Hexyl | Phenyl |
| Octyl | Xylyl |
| Decyl | —$C_6H_3(C_2H_5)_2$ |
| Benzyl | —$C_6H_4(CH_2)_{11}CH_3$ |
| Cyclohexyl | Cinnamyl |
| Cyclopentyl | Naphthyl |
| Methylcyclopentyl | Propargyl |
| Cyclopentadienyl | Tolyl |
| Vinylphenyl | |

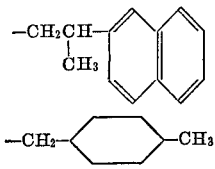

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical.

Examples are:

Halide (fluoride, chloride, bromide, iodide)
Ether (especially lower alkoxy)
Keto
Ester (especially lower carbalkoxy)
Aminoacyl (amide)
Nitro
Cyano
Thioether
Sulfoxy
Sulfone
Sulfonic acid ester
Sulfonamide In general, no more than about three such substituent groups will be present for each 10 carbon atoms in the radical.

The hydrocarbon or substituted hydrocarbon radicals represented by $R^1$, $R^2$ and $R^3$ in the compositions of this invention are usually free from ethylenic and acetylenic unsaturation and have no more than about 30 carbon atoms, desirably no more than about 12 carbon atoms. They are preferably lower hydrocarbon radicals, especially lower alkyl and aryl radicals, (most often alkyl), the word "lower" denoting radicals containing up to seven carbon atoms. Still more preferably, at least one of $R^1$ and $R^2$ is hydrogen, the other is hydrogen or a lower alkyl radical and $R^3$ is a lower alkyl radical, both lower alkyl radicals usually being methyl or ethyl.

The divalent radical R is also usually free from ethylenic and acetylenic unsaturation and has no more than about 30 carbon atoms, desirably no more than about 12 carbon atoms. It is preferably a lower hydrocarbon radical, especially a lower alkylene or arylene radical (most often alkylene) or a radical derived therefrom and containing one or more (generally only one) hydroxy substituents or polyol substituents containing repeating units having at least the first of the formulas given above.

The polyols of this invention may be obtained by reacting, in the presence of an alkaline reagent, a polyhydroxy compound of the formula HO—R—OH with a 5-pentanolide of the formula

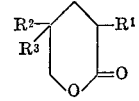

wherein R, $R^1$, $R^2$ and $R^3$ are as previously defined. These 5-pentanolides (delta-valerolactones) are known in the art. A typical method for their preparation is disclosed and claimed in my copending application Ser. No. 88,164, filed of even date herewith.

The reaction of the 5-pentanolide with the diol is effected in an anhydrous medium in the presence of a small amount of the alkaline reagent which may be an alkyllithium, an alkali metal hydride, amide, alkoxide or the like. It is frequently convenient merely to mix the reactants and allow the exothermic reaction to proceed, although it may sometimes be advisable to use a relatively non-polar solvent such as ethyl ether, tetrahydrofuran, dioxane, ethylene or diethylene glycol dimethyl ether or the like. The reaction temperature is ordinarily between room temperature and about 70° C.

Typical polyhydroxy compounds which may be used to produce the polyols of this invention are ethylene glycol, diethylene glycol, a butanediol, glycerol and the like. A relatively small amount of such polyhydroxy compound is generally used, usually about 1 mole for each 5–150 moles of 5-pentanolide.

Preparation of the polyols of this invention is illustrated by the following examples. All parts are by weight unless otherwise indicated. Specific and inherent viscosities are measured at 30° C. on a solution of 0.5 gram of the compound in 100 ml. of the indicated solvent.

EXAMPLE 1

Glycerol, 0.46 gram (0.005 mole), is added to a mixture of 64 grams (0.5 mole) of 4,4-dimethyl-5-pentanolide and 3.2 ml. of a 1.6 M solution of n-butyllithium in n-hexane, under nitrogen. An exothermic reaction occurs and the mixture soon solidifies. The solid product is dissolved in chloroform, precipitated with methanol, filtered, washed with methanol and dried. The resulting polyol has an inherent viscosity in chloroform of 0.15.

EXAMPLE 2

Sodium metal, 0.2 part, is added to 10 parts (0.11 mole) of 1,4-butanediol and the mixture is heated under nitrogen until solution is completed. It is then cooled to room temperature and 200 parts (1.56 moles) of 4,4-dimethyl-5-pentanolide is added rapidly, with shaking. An exothermic reaction occurs during which the product solidifies. It is dissolved in chloroform and the chloroform solution is washed with water and dried over magnesium sulfate, after which the chloroform is removed by filtration to yield the desired polyol.

EXAMPLE 3

Following the procedure of Example 2, a polyol is prepared from 200 parts (1.56 moles) of 4,4-dimethyl-5-pentanolide, 28.6 parts (0.32 mole) of 1,4-butanediol and 0.15 part of sodium. It has an inherent viscosity in chloroform of 0.049.

EXAMPLE 4

Following the procedure of Example 2, a polyol is prepared from 204 parts (1.59 moles) of 4,4-dimethyl-5-pentanolide, 14.2 parts (0.16 mole) of 1,4-butanediol and 0.15 part of sodium. It has an inherent viscosity in chloroform of 0.059.

EXAMPLE 5

Following the procedure of Example 2, a polyol is prepared from 200 parts (1.56 moles) of 2,4-dimethyl-5-pentanolide, 10 parts (0.16 mole) of ethylene glycol and 0.15 part of sodium.

EXAMPLE 6

Following the procedure of Example 2, a polyol is prepared from 200 parts (1.56 moles) of 4-ethyl-5-pentanolide, 14 parts (0.13 mole) of diethylene glycol and 0.15 part of sodium.

The polyols of this invention have uses typical of hydroxy-terminated polyesters. In particular, they may be reacted with polyisocyanates to form elastomeric polyurethanes which may be further extended with water, glycols, hydrazine and the like. The uses of these polyurethanes are similar to those of other elastomers. The extended polyurethanes may also be used in coating compositions to form films and coatings.

Among the polyisocyanates which may be reacted with the polyesters of this invention are toluene diisocyanate, diphenylmethane diisocyanate [bis-(4-isocyanatophenyl)-methane], naphthalene diisocyanate and the like. In general, compounds of the formula OCN—Z—NCO may be used, wherein Z is a divalent hydrocarbon or substituted hydrocarbon radical, preferably an aromatic or alkyl-aromatic radical. The polyurethanes thus prepared have repeating units of the formula

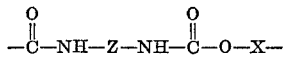

wherein X is derived from the polyols of this invention by abstraction of hydrogen from the hydroxy radicals thereof. When the polyurethane has been extended, it may also contain urea, alkylene-bis-carbamo, N,N'-bis-carbamohydrazide or similar moieties.

The preparation of polyurethanes from the polyols of this invention is illustrated by the following examples.

EXAMPLE 7

A mixture of 40 grams of the polyol of Example 2 and 9.8 grams of diphenylmethane diisocyanate is heated to 95° C. under nitrogen, with stirring, until it is homogeneous. It is then stirred for an additional hour and 75 ml. of N,N-dimethylacetamide is added. When solution is complete, 0.35 gram of water is added and stirring is continued for 3 hours. The resulting polyurethane is precipitated by pouring into water, soaked for three days in water and dried under vacuum. It has an inherent viscosity in N,N-dimethylacetamide of 0.72.

EXAMPLE 8

A mixture of 40 grams of the polyol of Example 3 and 17.2 grams of diphenylmethane diisocyanate is heated under nitrogen at 80° C. for 1 hour, with stirring, there are then added 200 ml. of N,N-dimethylacetamide and 22 ml. of a 5% solution of hydrazine in N,N-dimethylacetamide. The mixture is stirred for 1 hour at room temperature and the desired polyurethane is precipitated by pouring into water, washed and dried. It has an inherent viscosity in N,N-dimethylacetamide of 0.979.

EXAMPLE 9

Following the procedure of Example 7, a polyurethane is prepared from 40 grams of the polyol of Example 4, 13 grams of diphenylmethane diisocyanate and 0.47 gram of water. Upon addition of the water, the viscosity of the mixture becomes very high and an additional 125 ml. of N,N-dimethylacetamide is added. After precipitation from water and drying, the polyurethane has an inherent viscosity in N,N-dimethylacetamide of 0.90.

EXAMPLE 10

Following the procedure of Example 8, a polyurethane is prepared from 40 grams of the polyol of Example 4, 13 grams of diphenylmethane diisocyanate, a solution of 0.83 gram of hydrazine in 16.6 ml. of N,N-dimethylacetamide, and 150 grams of N,N-dimethylacetamide. After precipitation and drying, the polyurethane has an inherent viscosity in N,N-dimethylacetamide of 0.86.

EXAMPLE 11

The procedure of Example 9 is repeated, using the polyol of Example 5 and toluene diisocyanate in amounts equivalent to those of the reactants used in Example 9. A similar polyurethane is obtained.

EXAMPLE 12

Following the procedure of Example 9 and using equivalent amounts of reactants, a polyurethane is prepared from the polyol of Example 6, toluene diisocyanate and ethylene glycol.

What is claimed is:

1. Polyols which have terminal hydroxy groups and which consist essentially of the repeating units

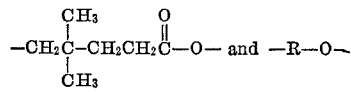

wherein R is a divalent hydrocarbon radical or a substituted hydrocarbon radical in which the substituents are halide, ether, keto, ester, aminoacyl, nitro, cyano, thioether, sulfoxy, sulfone, sulfonic acid ester or sulfonamide groups, said units being joined through ester linkages.

2. Polyols according to claim 1 wherein R is a lower alkylene radical.

3. Polyols according to claim 2 wherein R is $(CH_2)_4$.

4. A method for preparing polyols according to claim 1 which comprises reacting, in the presence of an alkaline reagent, a compound of the formula HO—R—OH with a 5-pentanolide of the formula

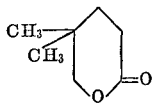

5. A method according to claim 4 wherein said reaction is effected in an anhydrous medium.

6. A method according to claim 5 wherein R is a lower alkylene radical.

7. A method according to claim 6 wherein the alkaline reagent is an alkyllithium or an alkali metal alkoxide.

8. A method according to claim 7 wherein R is $(CH_2)_4$.

References Cited

UNITED STATES PATENTS

| | | | |
|---|---|---|---|
| 2,933,478 | 4/1960 | Young et al. | 260—77.5 |
| 2,962,524 | 11/1960 | Hostettler et al. | 260—484 |
| 3,021,309 | 2/1962 | Cox et al. | 260—78.3 |
| 3,021,314 | 2/1962 | Cox et al. | 260—78.3 |
| 3,051,687 | 8/1962 | Young et al. | 260—77.5 |

FOREIGN PATENTS 1,131,885 10/1968 Great Britain.

OTHER REFERENCES

Chemical Abstracts 53, 11234i (1959).

HAROLD D. ANDERSON, Primary Examiner

E. A. NIELSEN, Assistant Examiner

U.S. Cl. X.R.

260—63 R, 77.5 AN, 78.3 R, 456 R, 465.6